(12) United States Patent
Hanafusa et al.

(10) Patent No.: US 10,218,007 B2
(45) Date of Patent: Feb. 26, 2019

(54) BIPOLAR PLATE, REDOX FLOW BATTERY, AND METHOD FOR PRODUCING BIPOLAR PLATE

(71) Applicant: Sumitomo Electric Industries, Ltd., Osaka-shi (JP)

(72) Inventors: Kei Hanafusa, Osaka (JP); Kenichi Itou, Osaka (JP); Souichirou Okumura, Osaka (JP); Takemi Terao, Osaka (JP); Hayato Fujita, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 75 days.

(21) Appl. No.: 15/305,768

(22) PCT Filed: Jan. 23, 2015

(86) PCT No.: PCT/JP2015/051778
§ 371 (c)(1),
(2) Date: Oct. 21, 2016

(87) PCT Pub. No.: WO2015/162954
PCT Pub. Date: Oct. 29, 2015

(65) Prior Publication Data
US 2017/0047594 A1    Feb. 16, 2017

(30) Foreign Application Priority Data
Apr. 23, 2014 (JP) .................. 2014-089678

(51) Int. Cl.
*H01M 8/026* (2016.01)
*H01M 8/24* (2016.01)
(Continued)

(52) U.S. Cl.
CPC ............. *H01M 8/026* (2013.01); *B29C 43/02* (2013.01); *B29C 45/0013* (2013.01);
(Continued)

(58) Field of Classification Search
CPC ........ H01M 8/026; H01M 8/188; H01M 8/20; H01M 8/24
See application file for complete search history.

(56) References Cited

U.S. PATENT DOCUMENTS 6,649,297 B1 * 11/2003 Marchand ........... H01M 8/0228
429/513
2011/0123904 A1    5/2011 Fujimura et al.
(Continued)

FOREIGN PATENT DOCUMENTS

CN    102652374 A    8/2012
CN    102938468 A    2/2013
(Continued)

OTHER PUBLICATIONS

International Search Report in counterpart International Application No. PCT/JP2015/051778, dated Mar. 31, 2015.

*Primary Examiner* — Jonathan G Leong
*Assistant Examiner* — Victoria H Lynch
(74) *Attorney, Agent, or Firm* — Venable LLP; Michael A. Sartori; Laura G. Remus (57) ABSTRACT

Provided are a bipolar plate that can decrease the internal resistance of a flow battery, a redox flow battery, and a method for producing a bipolar plate. A bipolar plate sandwiched between a positive electrode in which a positive electrode electrolyte flows and a negative electrode in which a negative electrode electrolyte flows includes a positive-electrode-side surface in which a flow channel having a plurality of grooves through which the positive electrode electrolyte flows is provided and a negative-electrode-side surface in which a flow channel having a plurality of grooves through which the negative electrode electrolyte flows is provided. Each of the flow channels includes an inflow channel through which the electrolyte flows into the electrode and an outflow channel through which the electrolyte
(Continued)

flows out of the electrode, the inflow channel and the outflow channel are not in communication with each other and are independent from each other, and the grooves each have a wide portion inside the groove, the wide portion having a width larger than a width of an opening of the groove.

5 Claims, 4 Drawing Sheets

(51) Int. Cl.
*H01M 8/2483* (2016.01)
*B29C 43/02* (2006.01)
*B29C 45/00* (2006.01)
*B29C 65/00* (2006.01)
*H01M 8/18* (2006.01)
*H01M 8/20* (2006.01)
*B29K 105/16* (2006.01)
*B29L 31/34* (2006.01)

(52) U.S. Cl.
CPC .......... *B29C 45/0053* (2013.01); *B29C 66/72* (2013.01); *H01M 8/188* (2013.01); *H01M 8/20* (2013.01); *H01M 8/24* (2013.01); *H01M 8/2459* (2016.02); *H01M 8/2483* (2016.02); *B29K 2105/16* (2013.01); *B29K 2995/0005* (2013.01); *B29L 2031/3468* (2013.01); *Y02E 60/528* (2013.01); *Y02P 70/56* (2015.11)

(56) References Cited

U.S. PATENT DOCUMENTS

| | | | |
|---|---|---|---|
| 2012/0244395 | A1 | 9/2012 | Perry |
| 2013/0029196 | A1* | 1/2013 | Perry .................... H01M 8/188 429/70 |

FOREIGN PATENT DOCUMENTS

| | | |
|---|---|---|
| CN | 103413956 A | 11/2013 |
| JP | 2002-367659 A | 12/2002 |
| JP | 2004-265856 A | 9/2004 |
| JP | 2004-281146 A | 10/2004 |
| JP | 2007-305339 A | 11/2007 |
| JP | 2013-518362 A | 5/2013 |
| WO | 2011/075135 A1 | 6/2011 |
| WO | 2013/095378 A1 | 6/2013 |

\* cited by examiner

BIPOLAR PLATE, REDOX FLOW BATTERY, AND METHOD FOR PRODUCING BIPOLAR PLATE

TECHNICAL FIELD

The present invention relates to a bipolar plate used in flow battery such as a redox flow battery, a redox flow battery that uses the bipolar plate, and a method for producing a bipolar plate.

BACKGROUND ART

A representative example of the flow batteries is a redox flow battery (RF battery). An RF battery is a battery that performs charging and discharging by using the difference in oxidation-reduction potential between ions contained in a positive electrode electrolyte and ions contained in a negative electrode electrolyte.

Figure 5:
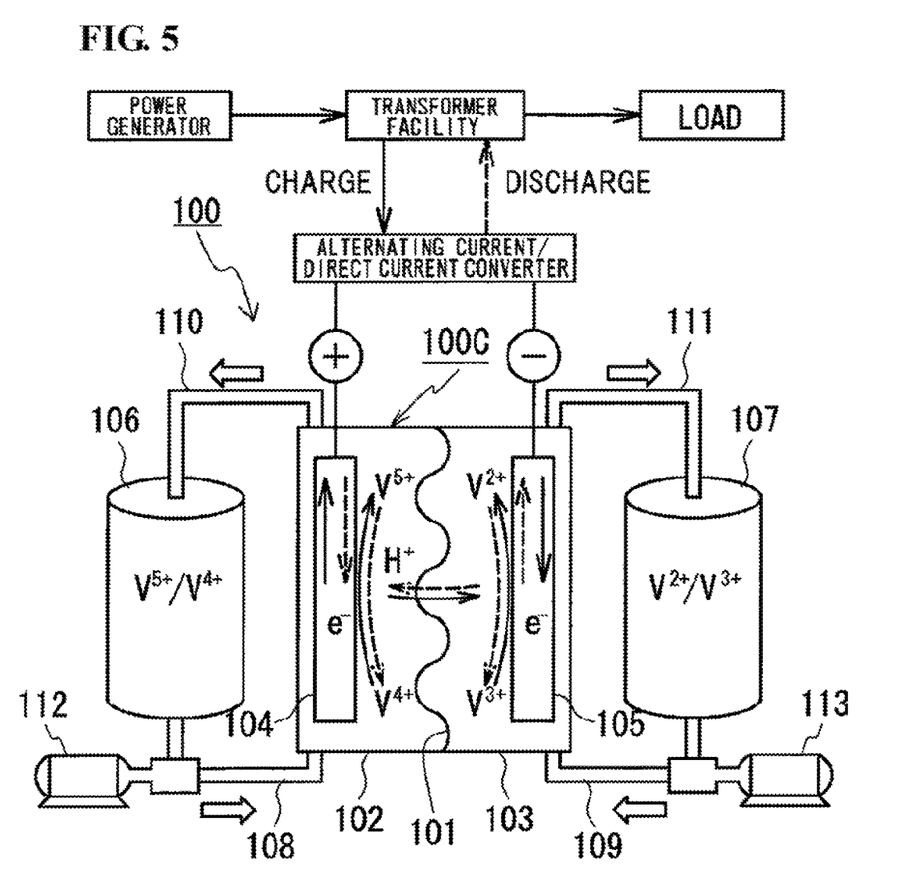
FIG. 5 is a schematic diagram showing the principle of a redox flow battery.

FIG. 5 is a diagram illustrating the operation principle of an RF battery 100 that uses vanadium ions as positive and negative electrode active materials. As illustrated in FIG. 5, the RF battery 100 includes a battery cell 100C that includes a positive electrode cell 102 and a negative electrode cell 103 separated from each other with a membrane 101 that allows hydrogen ions (protons) to permeate through.

The positive electrode cell 102 has a positive electrode 104 inside and is connected to a positive electrode electrolyte tank 106 that stores a positive electrode electrolyte via ducts 108 and 110. Likewise, the negative electrode cell 103 has a negative electrode 105 inside and is connected to a negative electrode electrolyte tank 107 that stores a negative electrode electrolyte via ducts 109 and 111. Pumps 112 and 113 respectively cause the electrolytes stored in the tanks 106 and 107 to circulate in the cells 102 and 103 during charging and discharging.

Figure 6:
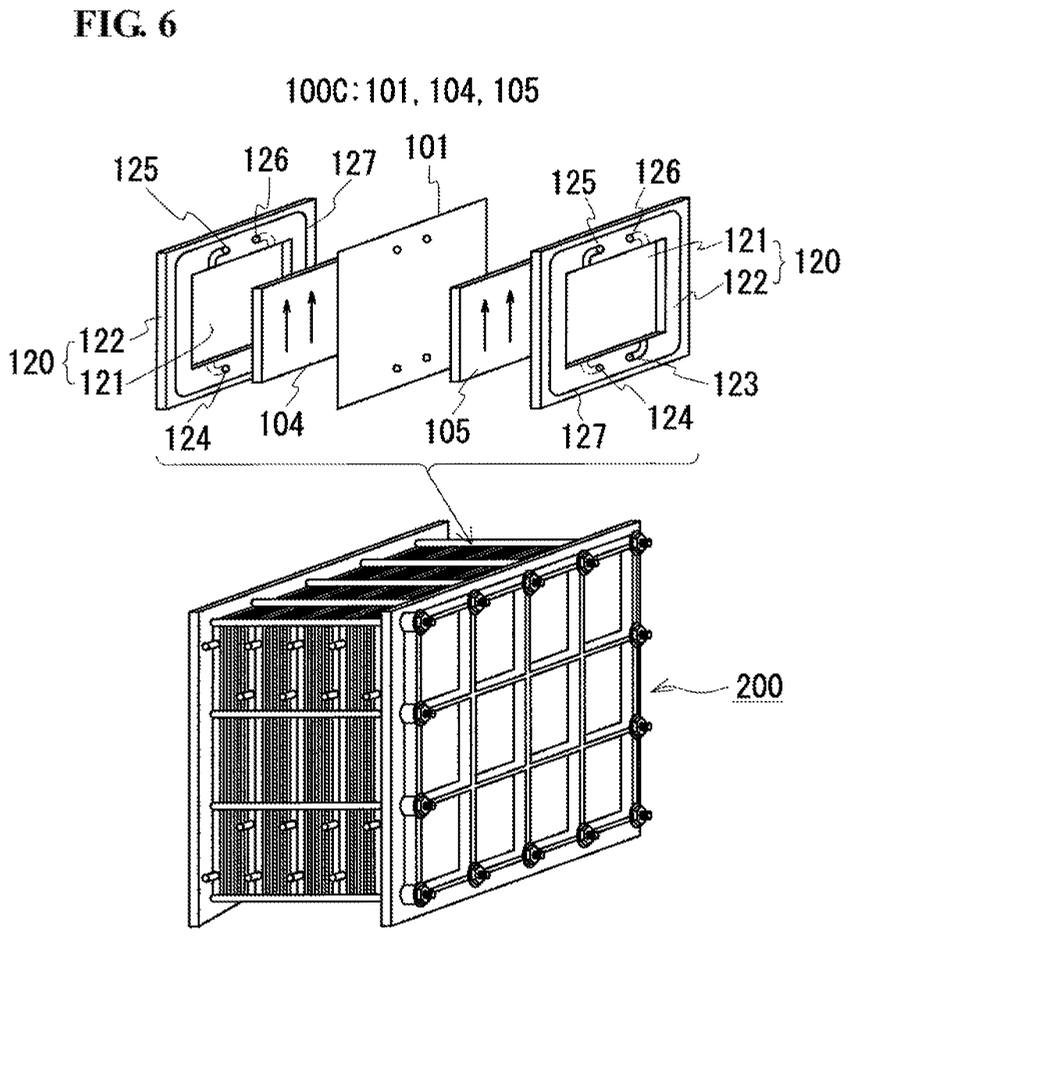
FIG. 6 is a schematic diagram of a cell stack included in a redox flow battery.

Typically, the battery cell 100C is formed inside a structure called a cell stack 200, as illustrated in a lower part of FIG. 6. As illustrated in the upper part of FIG. 6, the cell stack 200 has a structure formed by stacking a plurality of battery cells 100C, which each include the positive electrode 104, the membrane 101, and the negative electrode 105 stacked on top of each other and are sandwiched by cell frames 120 each constituted by a picture-frame-shaped frame body 122 and a bipolar plate 121 integrated with each other. In other words, one battery cell 100C is formed between the bipolar plates 121 of adjacent cell frames 120 and the positive electrode 104 (positive electrode cell 102) and the negative electrode 105 (negative electrode cell 103) of the adjacent battery cells 100C are respectively disposed on front and back sides of the bipolar plate 121 interposed therebetween. In this structure, the gap between the cell frames 120 is sealed with a seal structure 127.

In the cell stack 200, the electrolytes flow into and out of the battery cell 100C through liquid supply manifolds 123 and 124 and liquid discharge manifolds 125 and 126 formed in the frame body 122. The positive electrode electrolyte is supplied from the liquid supply manifold 123 to the positive electrode 104 disposed on one side of the bipolar plate 121 via a groove formed on one side (front side with respect to the plane of the paper of the drawing) of the frame body 122. The positive electrode electrolyte is discharged into the liquid discharge manifold 125 via a groove formed in an upper part of the frame body 122. Likewise, the negative electrode electrolyte is supplied from the liquid supply manifold 124 to the negative electrode 105 disposed on the other side of the bipolar plate 121 via a groove formed on the other side (rear side with respect to the plane of the paper of the drawing) of the frame body 122. The negative electrode electrolyte is discharged into the liquid discharge manifold 126 via a groove formed in the upper part of the frame body 122.

The electrodes 104 and 105 constituting the battery cell 100C are in many cases formed of a porous conductive material so that the flow of the electrolyte, which is a fluid, does not obstruct the flow of the electrolyte from the liquid supply side to the liquid discharge side. For example, a carbon felt or the like is used (Patent Literature 1).

CITATION LIST

Patent Literature

PTL 1: Japanese Unexamined Patent Application Publication No. 2002-367659

SUMMARY OF INVENTION

Technical Problem

In recent years, there have been expectation for an energy system that is friendly to natural environment and for improvements of battery performance of flow batteries such as RF batteries. For example, storage batteries, such as RF batteries, are expected to achieve improved charge-discharge efficiency and lower battery internal resistance. One of the factors that affect the internal resistance is the state of the flow of the electrolyte, for example, the flow resistance of the electrolyte. However, in the related art, not enough studies have been made on reducing the internal resistance while sufficiently considering the pressure loss caused by the flow resistance of the electrolyte.

The present invention has been made under the above-mentioned circumstances. One of the objects of the present invention is to provide a bipolar plate that can decrease a pressure loss of the electrolyte in a flow battery. Another object of the present invention is to provide a redox flow battery that uses the bipolar plate of the present invention. Yet another object of the present invention is to provide a highly productive method for producing a bipolar plate.

Solution to Problem

A bipolar plate according to an embodiment of the present invention is a bipolar plate sandwiched between a positive electrode in which a positive electrode electrolyte flows and a negative electrode in which a negative electrode electrolyte flows, the bipolar plate including a positive-electrode-side surface in which a flow channel having a plurality of grooves through which the positive electrode electrolyte flows is provided and a negative-electrode-side surface in which a flow channel having a plurality of grooves through which the negative electrode electrolyte flows is provided. Each of the flow channels includes an inflow channel through which the electrolyte flows into the electrode and an outflow channel through which the electrolyte flows out of the electrode. The inflow channel and the outflow channel are not in communication with each other and are independent from each other. The grooves each have a wide portion inside the groove, the wide portion having a width larger than a width of an opening of the groove.

A method for producing a bipolar plate according to one embodiment of the present invention is a method for producing a bipolar plate sandwiched between a positive electrode in which a positive electrode electrolyte flows and a negative electrode in which a negative electrode electrolyte flows, the method including a base plate preparation step, a segment preparation step, and a bonding step. In the base plate preparation step, a base plate formed of a material containing a dispersed conductive material and a matrix resin is prepared. In the segment preparation step, segments that are long components formed of the material and having a particular cross-sectional shape and that form part of grooves through which the electrolytes flow are prepared. In the bonding step the segments are bonded to both surfaces of the base plate at particular intervals so as to form the grooves with spaces defined by the base plate and the segments. In the bonding step, the segments are bonded so that the grooves each have a wide portion inside the groove, the wide portion having a width larger than a width of an opening of the groove.

Advantageous Effects of Invention

The bipolar plate can decrease the pressure loss of the electrolyte in a flow battery.

According to the method for producing the bipolar plate, a bipolar plate that can decrease the pressure loss of the electrolyte in a flow battery can be produced at high productivity.

DESCRIPTION OF EMBODIMENTS

Description of Embodiments of the Present Invention

First the contents of the embodiments of the present invention are described in the form of a list.

(1) A bipolar plate according to an embodiment is a bipolar plate sandwiched between a positive electrode in which a positive electrode electrolyte flows and a negative electrode in which a negative electrode electrolyte flows, the bipolar plate including a positive-electrode-side surface in which a flow channel having a plurality of grooves through which the positive electrode electrolyte flows is provided and a negative-electrode-side surface in which a flow channel having a plurality of grooves through which the negative electrode electrolyte flows is provided. Each of the flow channels includes an inflow channel through which the electrolyte flows into the electrode and an outflow channel through which the electrolyte flows out of the electrode. The inflow channel and the outflow channel are not in communication with each other and are independent from each other. The grooves each have a wide portion inside the groove, the wide portion having a width larger than a width of an opening of the groove.

Since a bipolar plate equipped with flow channels that include grooves is used, flows of the electrolytes along the flow channels are promoted and the flows of the electrolytes flowing in the electrodes can be controlled compared to when no flow channels are provided. Since the flows of the electrolytes are adjusted, the pressure loss of the electrolytes can be decreased. In particular, since the grooves that constitute the flow channels each have the wide portion, the electrolytes smoothly flow and the pressure loss of the electrolytes can be further decreased compared to the grooves that have a constant width without the wide portions but with the same opening width. Moreover, since the electrolyte flow rate can be ensured by the presence of the wide portions, the depth of the grooves having wide portions can be decreased and the thickness of the bipolar plate can be decreased while maintaining the flow rate of the electrolyte substantially the same compared to a bipolar plate having grooves with a constant width provided that the width of the opening of the groove is the same and the cross-sectional area of the groove is the same. Since the thickness of the bipolar plate is decreased, the internal resistance of a flow battery can be decreased. Since the inflow channel and the outflow channel of the flow channel are not in communication with each other and are independent from each other, the electrolytes smoothly flow through the electrodes by traversing the portions between the inflow channel and the outflow channel; thus, the battery reaction at the electrodes is activated and the internal resistance of the battery can be decreased.

(2) According to the bipolar plate of an embodiment, an inter-groove distance between side edges of the openings of the adjacent grooves is larger than the width of the opening, for example.

According to this feature, the contact area between the bipolar plate and the electrode is increased, the battery reaction at the electrode in the portion between the inflow channel and the outflow channel is further activated, and the internal resistance is more easily decreased.

(3) According to the bipolar plate of an embodiment, the grooves each have a trapezoidal cross-sectional shape that spreads from the opening toward a bottom of the groove, for example.

Since the cross-sectional shape of the groove is trapezoidal, the shape is simple and the groove can be easily formed.

(4) According to the bipolar plate of an embodiment, the grooves each include a narrow portion that has a constant width from the opening toward a bottom of the groove and the wide portion that is connected to the narrow portion and has a constant width down to the bottom, for example.

Because the groove is constituted by a narrow portion and a wide portion, the electrolyte flows are easy to adjust and the pressure loss of the electrolytes can be easily decreased. For example, when the narrow portion is formed near the opening of the groove and the wide portion having a particular width is formed inside the groove, the cross-sectional area of the groove is increased compared to the groove having the same opening width and a constant width; thus, a larger flow rate of the electrolytes can be ensured and the pressure loss is easily decreased.

(5) According to the bipolar plate of an embodiment, when the opening has a width x, the grooves each have a cross-sectional area equal to or larger than 10 times $x^2$, for example.

Since the cross-sectional area of the groove is equal to or larger than 10 times $x^2$, a sufficient flow rate of the electrolyte can be ensured compared to the groove in which the width of the opening is the same as the depth of the groove, and thus pressure loss can be further decreased.

(6) According to the bipolar plate of an embodiment, the inflow channel and the outflow channel each have a comb-teeth-shaped region, and the inflow channel and the outflow channel are arranged so that the comb-teeth-shaped regions oppose each other so as to be interdigitated, for example.

Since the inflow channel and the outflow channel are arranged so that the comb-teeth-shaped regions oppose each other so as to be interdigitated, the comb-teeth-shaped regions of the inflow channel and the outflow channel align parallel to each other. As a result, the amount of the electrolytes that flow through the electrodes by traversing the regions between the comb-teeth-shaped regions is further increased compared to when the comb-teeth-shaped regions are not interdigitated. Thus, the battery reaction at the electrodes is further activated and the internal resistance of the battery can be further decreased. Moreover, the electrolytes easily flow evenly in any positions in the electrodes, the battery reaction can be easily carried out evenly over a wide range of the electrodes, and thus the internal resistance can be decreased.

(7) According to a redox flow battery of an embodiment, the bipolar plate of any one of embodiments (1) to (6) above is included, for example.

The redox flow battery of this embodiment has superior battery performance. This is because it is equipped the bipolar plate of the embodiment so that the pressure loss of the electrolytes is decreased and the internal resistance of the battery is decreased due to activation of battery reaction at the electrodes.

(8) A method for producing a bipolar plate according to an embodiment is a method for producing a bipolar plate sandwiched between a positive electrode in which a positive electrode electrolyte flows and a negative electrode in which a negative electrode electrolyte flows, the method including a base plate preparation step, a segment preparation step, and a bonding step. In the base plate preparation step, a base plate formed of a material containing a dispersed conductive material and a matrix resin is prepared. In the segment preparation step, segments that are long components formed of the material and having a particular cross-sectional shape and that form part of grooves through which the electrolytes flow are prepared. In the bonding step, the segments are bonded to both surfaces of the base plate at particular intervals so as to form the grooves with spaces defined by the base plate and the segments. In the bonding step, the segments are bonded so that the grooves each have a wide portion inside the groove, the wide portion having a width larger than a width of an opening of the groove.

According to the method for producing a bipolar plate, the bipolar plate according to an embodiment can be easily produced by preparing a base plate and segments independently and then bonding the segments to the base plate so that spaces defined by the base plate and the segments serve as grooves having a particular shape. Since grooves are formed by bonding segments to the base plate, grooves having complicated shapes can be produced.

Detailed Description of Embodiments of the Present Invention

The embodiments of the present invention are described in detail below. It should be understood that the present invention is not limited to these illustrative embodiments but defined by the claims and is intended to include all modifications and alterations within the scope of the claims and the meaning and scope of equivalents thereof.

Embodiment 1

In Embodiment 1, a bipolar plate 1 used in a redox flow battery (hereinafter referred to as an RF battery), which is a representative example of a flow battery, is described with reference to FIGS. 1 and 2. The structures other than the bipolar plate 1 can be the same as those of the RF battery 100 of the related art described with reference to FIGS. 5 and 6 and thus the detailed descriptions thereof are omitted. For the sake of convenience, the bipolar plate 1 in FIG. 2 is illustrated to be thicker than the positive electrode 104 and the negative electrode 105.

<<Bipolar Plate>>

The bipolar plate 1 is a partition plate that divides each battery cell 100C (refer to FIG. 6). A positive electrode 104 and a negative electrode 105 of adjacent battery cells 100C are respectively disposed on front and back sides of a bipolar plate 1 interposed therebetween.

The main feature of the bipolar plate 1 of this embodiment is that each of the positive electrode 104-side surface and the negative electrode 105-side surface has a flow channel 10 that includes a plurality of grooves 11 through which a positive electrode electrolyte or a negative electrode electrolyte flows.

[Flow Channel]

The flow channels 10 are provided to adjust the flows of the electrolytes in the positive electrode 104 and the negative electrode 105 inside each battery cell 100C by using pumps. The flows of the electrolytes can be adjusted by changing the shape and dimensions of the flow channels 10, etc. As shown in FIG. 1, the flow channel 10 includes an inflow channel 10i through which an electrolyte flows into the electrode and an outflow channel 10o through which the electrolyte flows out of the electrode.

The inflow channel 10i is connected to the liquid supply manifold 123 (124) and the outflow channel 10o is connected to the liquid discharge manifold 125 (126). The inflow channel 10i and the outflow channel 10o are not in communication with each other and are independent from each other. The flow channel 10 is formed of grooves 11 described below. In the description below, the shape of the flow channel 10 is described first and then the grooves 11 that constitute the flow channel 10 are described.

<Shape of Flow Channel>

Figure 1:
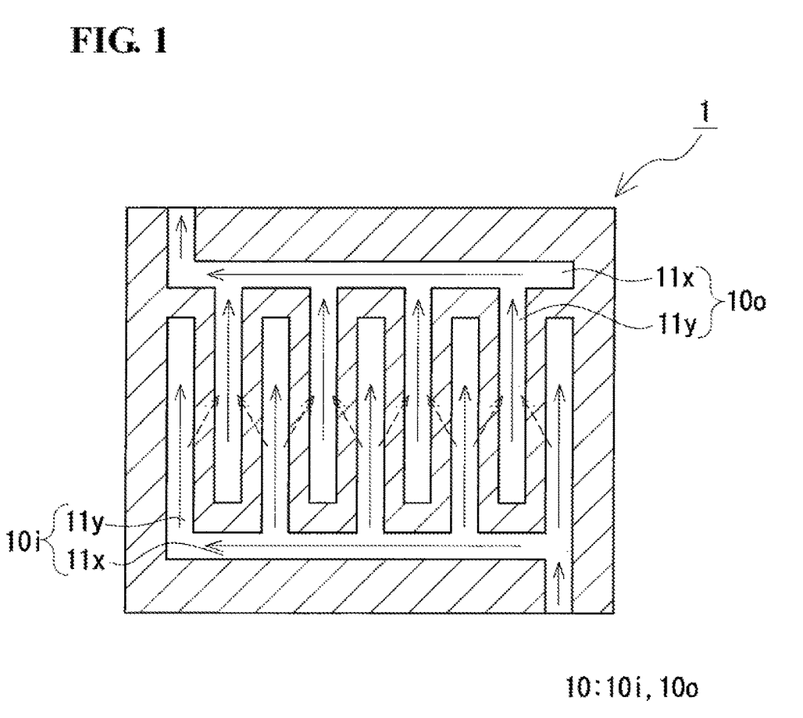
FIG. 1 is a schematic plan view of a flow channel having an opposing interdigitated comb-teeth shape formed in a bipolar plate according to Embodiment 1.
Figure 2:
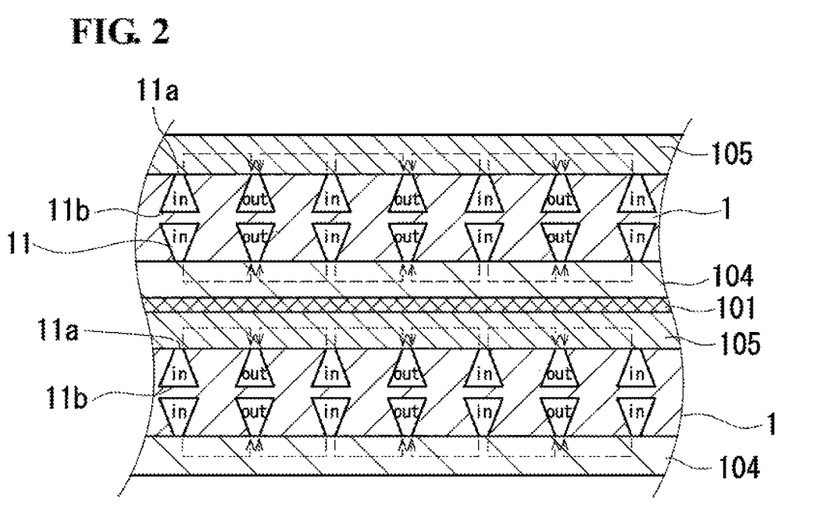
FIG. 2 is a schematic cross-sectional view of the flow channel having an opposing interdigitated comb-teeth shape formed in the bipolar plate according to Embodiment 1.

In the flow channel 10 of the bipolar plate 1 shown in FIG. 1, the inflow channel 10i and the outflow channel 10o each have a comb-teeth-shaped region and are arranged to oppose each other in an interdigital manner so that the flow channel has an opposing interdigitated comb-teeth shape. The inflow channel 10i (outflow channel 10o) has one horizontal groove 11x and a plurality of vertical grooves 11y extending from the horizontal groove 11x. The horizontal groove 11x is connected to the liquid supply manifolds 123 and 124 (liquid discharge manifolds 125 and 126) and the vertical grooves 11y are aligned in parallel to one another so that the inflow channel 10i and the outflow channel 10o are interdigitated.

The flow of the electrolyte creates a flow along the flow channel 10 of the bipolar plate 1 (a flow in a direction of a solid arrow in FIG. 1) and a flow that traverses the portion (ridge) between the vertical grooves 11y of the inflow channel 10i and the outflow channel 10o in the width direction (the horizontal direction in the drawing) (a flow in a direction of a broken arrow in FIGS. 1 and 2). In other words, the electrolytes introduced from the inflow channel 10*i* cause a battery reaction in the ridges at the electrodes as the electrolytes flow into the outflow channel 10*o* via the positive electrode 104 and the negative electrode 105. Since the introduced electrolytes are discharged as they traverse the ridges, the amount of unreacted electrolytes that are discharged decreases.

As a result, the amount of current of the RF battery is increased and the internal resistance of the RF battery can be decreased.

When the length of the interdigitated portion of the comb-teeth-shaped regions of the inflow channel 10*i* and the outflow channel 10*o* is large, the amount of the electrolytes that flow by traversing the ridges can be expected to increase. The length is, for example, 80% or more or 90% or more of the length of the bipolar plate 1 (length in the vertical direction of the drawing).

The interdigitated comb-teeth shape is not limited to the arrangement described above. For example, the inflow channel 10*i* (outflow channel 10*o*) may be disposed on the left side (right side) of the bipolar plate 1 in the drawing and may include one vertical groove extending in the length direction and a plurality of horizontal grooves that extend from the vertical groove to the right side (left side) of the drawing.

Another example is a non-interdigitated comb-teeth shape. A non-interdigitated comb-teeth shape is a shape in which the inflow channel 10*i* and the outflow channel 10*o* are not interdigitated with each other. For example, one horizontal groove is disposed on the lower side (upper side) of the bipolar plate and a plurality of vertical grooves extend from the horizontal groove in the upward direction (downward direction) so that the vertical grooves of the inflow channel 10*i* and the vertical grooves of the outflow channel 10*o* are symmetrically arranged in the upper portion and the lower portion. According to the non-interdigitated comb-teeth shape, electrolytes cause a battery reaction at the electrodes in the ridges located between flow channels that are vertically adjacent to each other. Thus, the amount of unreacted electrolytes that are discharged decreases and the amount of electric current of the RF battery is expected to increase.

Each of the flow channels 10 described as examples above may include breaks at least partly. For example, the vertical grooves 11*y* shown in FIG. 1 may be formed to have broken portions (non-continuous). In this manner, the electrolytes not only traverse the ridges in the width direction but also traverse the ridges between adjacent vertical grooves separated from each other in the length direction as the electrolytes flow through the electrodes. Thus, the amount of reaction current is expected to increase.

<Grooves>

Figure 3:
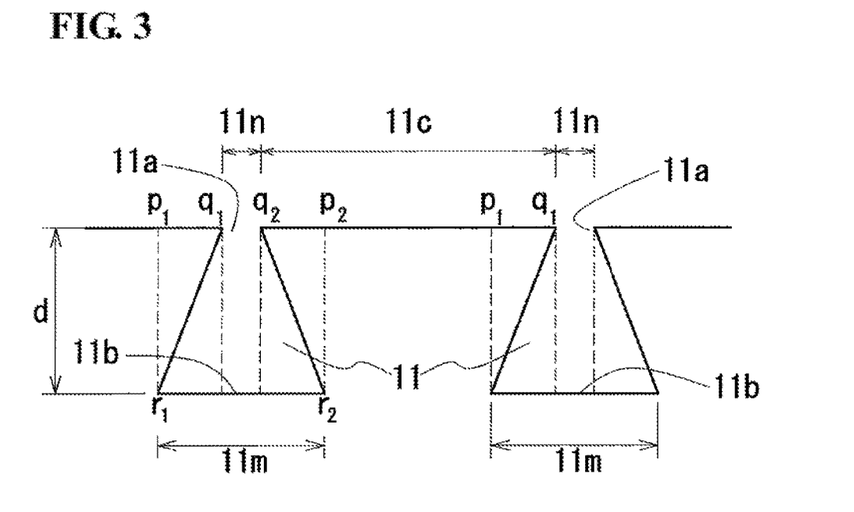
FIG. 3 is a schematic diagram illustrating the shape of grooves formed in the bipolar plate of Embodiment 1.

As shown in FIGS. 2 and 3, the grooves 11 have a cross-sectional shape that has an inner portion with a width larger than the width of the opening 11*a*. Here, the shape is a trapezoidal shape that spreads from the opening 11*a* toward a bottom 11*b*. As shown in FIG. 3, the groove 11 includes a narrow portion 11*n* at the opening 11*a* which is the narrowest part, and a wide portion 11*m* whose width increases toward the bottom 11*b* so as to be wider than the narrow portion 11*n*. Here, the widest of the wide portion 11*m* is the bottom 11*b*. When the groove 11 includes a wide portion 11*m*, the flow of the electrolytes can be facilitated and the pressure loss of the electrolytes can be further decreased. The cross-sectional shape of the groove 11 is not limited to the trapezoidal shape described above as long as the wide portion 11*m* is provided. In other words, a substantially trapezoidal shape in which a side surface or a bottom surface of the groove is curved is also defined as the trapezoidal shape. The cross-sectional shape of the groove 11 may be circular, semicircular, or convex, for example, as long as the wide portion 11*m* is present. Not all grooves 11 (flow channels 10) may be grooves 11 with wide portions 11*m*. For example, grooves having a square or rectangular shape with a constant width and grooves 11 that have wide portions 11*m* may be arranged alternately.

An inter-groove distance 11*c* (corresponding to the width of the ridge described above) between side edges of the openings 11*a* of the adjacent grooves 11 is preferably longer than the width of the opening 11*a* of at least one of the two adjacent grooves 11. When the inter-groove distance 11*c* is large, the contact area with the electrode is increased and the amount of the reaction current at the electrode in the ridge can be expected to increase. Thus, the inter-groove distance 11*c* is preferably three times the width of the opening 11*a* or more and is more preferably seven times the width of the opening 11*a* or more. Meanwhile, if the inter-groove distance 11*c* is large, the number of grooves 11 (flow channels 10) present per unit length in the direction in which the grooves align in parallel in the bipolar plate 1 is decreased. Thus, the inter-groove distance 11*c* is preferably 30 times the width of the opening 11*a* or less and more preferably 20 times the width of the opening 11*a* or less.

The size of the groove 11 will now be described with reference to FIG. 3. The depth d of the groove 11 is, for example, 10% or more and 45% or less of the thickness of the bipolar plate 1. When the grooves 11 are on both surfaces of the bipolar plate 1, due to the structure of the RF battery, the grooves 11 are preferably located to overlap one another in a perspective plan view (refer to FIG. 2). In this case, if the thickness of a portion between a pair of grooves 11 opposing each other in the thickness direction of the bipolar plate 1 is small, the mechanical strength may be insufficient. The depth d of the groove 11 is more preferably 10% or more and 35% or less of the thickness of the bipolar plate 1. The grooves 11 may be located so as not to overlap each other in a perspective plan view of the bipolar plate 1.

When the cross-sectional area of the grooves 11 in the bipolar plate 1 is large, the pressure loss of the electrolytes flowing through the grooves 11 can be expected to decrease. In forming the grooves 11 in the bipolar plate 1, grooves 11 having a square shape, which are easy to form, are first considered. For example, suppose that a groove 11 (portion surrounded by $p_1$-$p_2$-$r_2$-$r_1$ in FIG. 3) has a square shape with a cross-sectional area $d^2$ in which the width of the opening 11*a* is equal to the depth (d) of the groove 11. Then the inter-groove distance 11*c* equals the distance $p_2$-$p_1$ between side edges of the openings 11*a* of the adjacent grooves 11. On the other hand, when the inter-groove distance 11*c* is large, the contact area between the bipolar plate 1 and the electrode is increased and the amount of reaction current in the electrode in the ridge can be expected to increase. In view of this, increasing the inter-groove distance 11*c* is considered next in order to increase the reaction current in the electrode. For example, when the width of the opening 11*a* of each groove 11 is decreased, the inter-groove distance 11*c* equals the distance $q_2$-$q_1$ between the side edges of the openings 11*a* of the adjacent grooves 11 and increases by 2×(distance $q_2$-$p_2$). However, since the width of the opening 11*a* is decreased, the area of the groove 11 decreases by 2×(area of portion surrounded by $p_2$-$q_2$-$r_2$). In other words, in this embodiment, the balance between the pressure loss of the electrolyte flowing through the groove 11 and the amount of reaction current in the electrode is considered in determining the width of the opening 11a and the cross-sectional area (wide portion) of the groove 11. For example, assuming, that the opening 11a has a width x, the wide portion may be determined such that the cross-sectional area of the groove 11 is equal to or larger than 10 times $x^2$ or 15 times $x^2$. When the wide portion is determined such that the cross-sectional area of the groove 11 is equal to or smaller than 30 times $x^2$ or 20 times $x^2$, the mechanical strength of the bipolar plate 1 can become sufficient. The width of the opening 11a is, for example, 0.1 mm or more and 1 mm or less, preferably 0.1 mm or more and 0.8 mm or less, and more preferably 0.1 mm or more and 0.5 mm or less.

A conductive material that passes electric current but not electrolytes can be used as the material for the bipolar plate 1. Such a material having acid resistance and appropriate rigidity is more preferable. This is because the cross-sectional shape and dimensions of the grooves (flow channels) do not readily change and the effects of the flow channels are easy to maintain over a long period of time. Examples of such material include carbon-containing conductive materials. Specific examples thereof include conductive plastics formed of graphite and polyolefin organic compounds or chlorinated organic compounds. A conductive plastic in which part of graphite is substituted with at least one of carbon black and diamond-like carbon may also be used. Examples of the polyolefin organic compounds include polyethylene, polypropylene, and polybutene. Examples of the chlorinated organic compounds include vinyl chloride, chlorinated polyethylene, and chlorinated paraffin. When the bipolar plate is formed of such a material, the electrical resistance of the bipolar plate can be decreased and acid resistance is improved.

[Method for Producing Bipolar Plate]

A method for producing a bipolar plate according to an embodiment includes the following base plate preparation step, segment preparation step, bonding step. These steps are described below one by one.

<Base Plate Preparation Step>

A base plate formed of a material (electrically conductive composite plastic) containing a dispersed conductive material and a matrix resin is prepared. Here, a flat-plate-shaped base plate is prepared. Examples of the dispersed conductive material include powder and fibers of inorganic materials such as graphite, carbon black, and diamond-like carbon. Examples of the material suitable as conductive carbon black include acetylene black and furnace black. Other examples include powder and fibers of metals such as aluminum.

Examples of the matrix resin include polyethylene, polypropylene, polybutene, vinyl chloride, chlorinated polyethylene, and chlorinated paraffin.

<Segment Preparation Step>

Segments, which are long components formed of the material described above having a particular cross-sectional shape and which form part of the grooves through which the electrolytes flow, are prepared. Here, segments having a trapezoidal cross-sectional shape corresponding to the parts between the grooves 11 adjacent to each other shown in FIG. 2 are prepared. The material for the segments is preferably the same as the material for the base plate; however, for example, the type of the dispersed conductive material or matrix resin may be changed to differentiate the materials. The segments can be formed into a desired shape by compaction-molding a mixture of powder materials of the dispersed conductive material and a thermoplastic resin or by injection-molding a liquid material containing a molten thermoplastic resin and a dispersed conductive material, for example.

<Bonding Step>

The segments are bonded to both surfaces of the base plate at particular intervals so as to form grooves 11 (refer to FIG. 2) with spaces defined by the base plate and the segments. In this step, the segments are bonded to the base plate so that the each groove 11 to be formed has an inner wide portion 11m whose width is larger than a width of an opening 11a. The upper-side-surfaces of the segments having a trapezoidal cross-section are bonded to the surfaces of the base plate. When the segments are bonded to the base plate, referring to the bipolar plate 1 shown in FIG. 2, the base plate serves as a portion that comes between opposing bottoms 11b of the grooves 11 formed on both surfaces of the base plate, and the segments serve as portions that come between the adjacent grooves 11. Thus, a bipolar plate 2 equipped with grooves 11 can be easily produced.

<<Structures of RF Battery other than Bipolar Plate>>

In describing the bipolar plate 1, it was mentioned that conventional components can be used as the structures of the RF battery 100 (refer to FIGS. 5 and 6) other than the bipolar plate 1. An RF battery according to an exemplary embodiment includes battery cells each including a positive electrode, a membrane, and a negative electrode stacked on top of each other, and cell frames each including a picture-frame-shaped frame body and a bipolar plate integrated to the frame body, in which the battery cells sandwiched by the cell frames are stacked. The bipolar plate 1 that includes the groove 11 according to the above-described embodiment is used as the bipolar plate. In other words, one battery cell is disposed between bipolar plates 1 of adjacent cell frames, and a positive electrode and a negative electrode of adjacent battery cells are respectively disposed on front and back sides of the bipolar plate 1 interposed therebetween.

As shown in FIG. 5, vanadium-based electrolytes containing vanadium ions acting as active materials for respective electrodes are suitable as the electrolytes. Other examples of the suitable electrolytes include iron ($Fe^{2+}$/$Fe^{3+}$)-chromium ($Cr^{3+}$/$Cr^{2+}$)-based electrolytes in which iron (Fe) ions are used as a positive electrode active material and chromium (Cr) ions are used as a negative electrode active material, and manganese ($Mn^{2+}$/$Mn^{3+}$)-titanium ($Ti^{4+}$/$Ti^{3+}$)-based electrolytes in which manganese (Mn) ions are used as a positive electrode electrolyte and titanium (Ti) ions are used as a negative electrode electrolyte.

Embodiment 2

Figure 4:
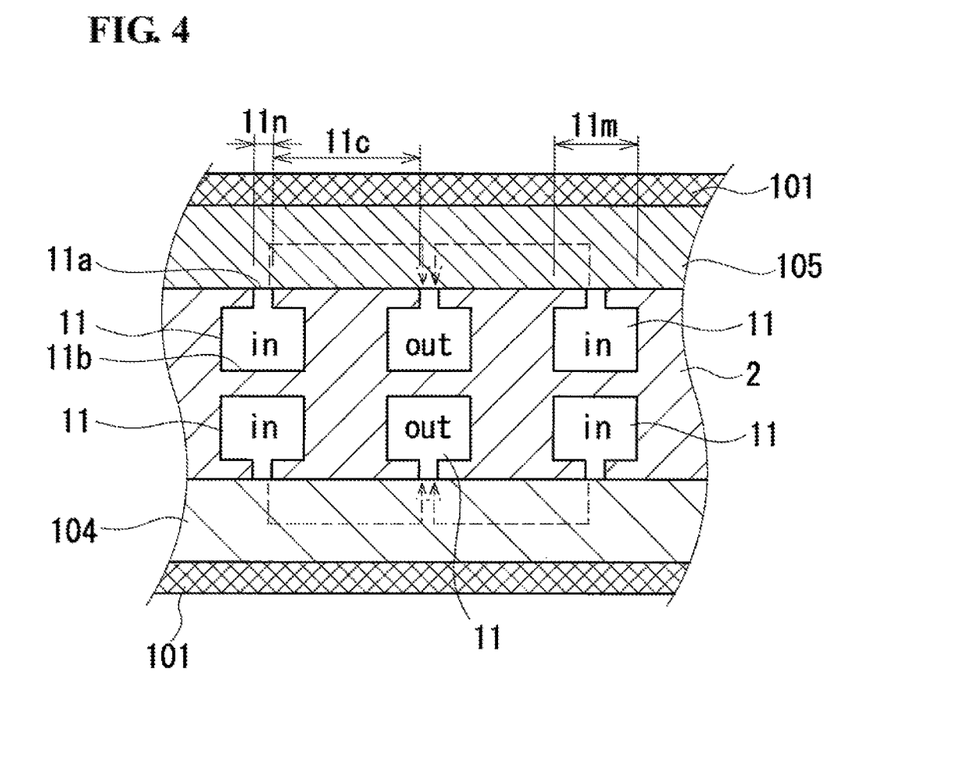
FIG. 4 is a schematic enlarged cross-sectional view showing the shape of the grooves formed in a bipolar plate of Embodiment 2.

A bipolar plate 2 according to Embodiment 2 will now be described with reference to FIG. 4. The basic structure of the bipolar plate 2 is the same as the bipolar plate 1 of Embodiment 1 and the only difference is the shape (cross-sectional shape) of the grooves 11. Here, this difference is described and descriptions of other structures are omitted. For the sake of convenience, the bipolar plate 2 shown in FIG. 4 is illustrated to be thicker than the positive electrode 104 and the negative electrode 105.

The grooves 11 each have a narrow portion 11n that has a constant width from the opening 11a toward the bottom 11b and a wide portion 11m that is connected to the narrow portion 11n and has a constant width down to the bottom 11b. In other words, the grooves 11 have a convex shape. Adjusting the ratio of the narrow portion 11n to the wide portion 11m facilitates control of the electrolyte flow and helps reduce pressure loss of the electrolyte flowing through the groove 11. The depth of the narrow portion 11n is, for example, 20% or more and 50% or less of the depth of the groove 11. When the depth of the narrow portion 11n is 20% or more of the depth of the groove 11, the mechanical strength near the opening 11a can be ensured. When the depth is 50% or less, the pressure loss of the electrolyte flowing through the groove 11 can be sufficiently reduced. The depth of the narrow portion 11n is more preferably 25% or more and 40% or less.

The bipolar plate 2 of Embodiment 2 can be produced by the same production method as in Embodiment 1 (preparing a base plate and segments and then bonding the segments to the base plate). In such a case, the following three processes are possible. The first process involves preparing a flat-plate-shaped base plate, segments A corresponding to the regions between the wide portions 11m of the adjacent grooves 11, and segments B corresponding to the regions between narrow portions 11n of the adjacent grooves 11, bonding the segments A onto the base plate, and then bonding the segments B onto surfaces of the segments A opposite from the base plate. The segments A have a substantially rectangular shape and the segments B have a flat-plate shape having a width larger than and a thickness smaller than those of the segments A. When a segment B is bonded onto a segment A, a T-shaped cross-section is produced. In this process, a surface of a substantially rectangular segment A is bonded to a surface of the base plate, and a surface of the flat-plate-shaped segment B is bonded onto the surface of the segment A opposite to the aforementioned surface. The second process involves preparing a flat-plate-shaped base plate and segments C having a T cross-sectional shape in which the segment A and the segment B are integrated, and then bonding the segments C onto the base plate. In this process, the narrower part of the segment C (part corresponding to the segment A) having a t cross-sectional shape is bonded onto a surface of the base plate. The third process involves preparing a base plate having portions corresponding to the segments A formed by press-forming, and the segments B, and bonding the segments B onto the base plate. In this process, the surfaces of the flat-plate-shaped segments B are bonded to the projecting portions of the base plate in an orthogonal manner. With all processes, a bipolar plate 2 having grooves 11 can be produced by bonding segments onto a base plate at particular intervals.

Analytical Example 1

In Analytical Example 1, a fluid simulation was conducted assuming four models of RE batteries with bipolar plates having interdigitated comb-teeth shaped channels in order to determine the pressure loss of the RF batteries. In this analytical example, an RF battery having a single-cell structure formed by sandwiching a battery cell that includes a positive electrode/membrane/negative electrode stack by cell frames equipped with bipolar plates was used. The details of the four models with different groove shapes are described below.

[Model 1]
Bipolar plate
Length: 31.5 (mm), width: 28.9 (mm), thickness: 3.0 (mm)
Channel shape: opposing interdigitated comb-teeth shape
Number of channels (vertical grooves): 6 inflow channels and 6 outflow channels
Channel (vertical groove) length: 26.2 (mm)
Channel (horizontal groove) length: 28.9 (mm)
Cross-sectional shape of groove: dovetail groove (refer to FIGS. 2 and 3)
Width of opening of groove: 0.3 (mm)
Width of bottom of groove: 1.3 (mm)
Depth of groove: 1.3 (mm)
Inter-groove distance: 2.1 (mm)
Only grooves at two ends in the width direction had a width of opening of 0.3 (mm), a width of bottom of 0.8 (mm), and a depth of 1.3 (mm), and had a right trapezoid shape in which one of the sides extending from the opening to the bottom formed a right angle with the side at the bottom (not shown in the drawings).
Electrode
Length: 31.5 (mm), width: 28.9 (mm), thickness: 0.4 (mm)
Electrolyte
Vanadium sulfate aqueous solution (V concentration: 1.7 mol/L, sulfuric acid concentration: 4.3 mol/L)
State of Charge: 50%
Electrolyte flow rate at inlet: 5.4 (ml/min)
Electrolyte flow rate at outlet: free flow
Flow model: laminar flow model

[Model 2]
Bipolar plate
Length: 31.5 (mm), width: 28.9 (mm), thickness: 3.0 (mm)
Channel shape: opposing interdigitated comb-teeth shape
Number of channels (vertical grooves): 6 inflow channels and 6 outflow channels
Channel (vertical groove) length: 26.2 (mm)
Channel (horizontal groove) length: 28.9 (mm)
Cross-sectional shape of groove: convex shape constituted by a narrow portion and a wide portion (refer to FIG. 4)
Width of opening of groove (width of narrow portion): 0.3 (mm)
Width of bottom of groove (width of wide portion): 1.3 (mm)
Depth of groove: 1.3 (mm)
Height of narrow portion: 0.3 (mm), height of wide portion: 1.0 (mm)
Inter-groove distance: 2.3 (mm)
Only grooves at two ends in the width direction had a width of opening of 0.3 (mm), a width of bottom of 0.8 (mm), a depth of 1.3 (mm), a height of narrow portion of 0.3 (mm), and a height of wide portion of 1.0 (mm) and had a such a shape that formed a convex shape when two grooves at the two ends were brought together (not shown in the drawings).
Electrode and electrolyte: Same as Model 1.

[Model 3]
Bipolar plate
Length: 31.5 (mm), width: 28.9 (mm), thickness: 3.0 (mm)
Channel shape: opposing interdigitated comb-teeth shape
Number of channels (vertical grooves): 6 inflow channels and 6 outflow channels
Channel (vertical groove) length: 26.2 (mm)
Channel (horizontal groove) length: 28.9 (mm)
Cross-sectional shape of groove: square
Width of opening (bottom) of groove: 0.3 (mm)
Depth of groove: 0.3 (mm)
Inter-groove distance: 2.3 (mm)
Electrode and electrolyte: Same as Model 1

[Model 4]
Bipolar plate

Length: 31.5 (mm), width: 28.9 (mm), thickness: 3.0 (mm)

Channel shape: opposing interdigitated comb-teeth shape
Number of channels (vertical grooves): 6 inflow channels and 6 outflow channels
Channel (vertical groove) length: 26.2 (mm)
Channel (horizontal groove) length: 28.9 (mm)
Cross-sectional shape of groove: square
Width of opening (bottom) of groove: 1.3 (mm)
Depth of groove: 1.3 (mm)
Inter-groove distance: 1.3 (mm)
Only grooves at two ends in the width direction had an oblong shape with a width of opening of 0.8 (mm), a width of bottom of 0.8 (mm), and a depth of 1.3 (mm).
Electrode and electrolyte: Same as Model 1.

The pressure losses of the four models obtained from the pressure distributions within the electrodes were as follows: model 1: 118 Pa; model 2: 100 Pa; model 3: 2 kPa; and model 4: 62 Pa. Comparison of the models 1, 2, and 3 having a small opening width shows that the pressure loss can be notably decreased despite the small opening width since a portion having a width larger than the width of the opening of the groove is provided inside. Comparison of the models 1 and 2 having a small groove width and the model 4 whose groove has a large width at the opening and a square cross-sectional shape shows that the models 1 and 2 had a moderate increase in pressure loss but this level of pressure loss is acceptable.

Experimental Example 1

In Experimental Example 1, battery cells were actually produced from the four models of RF batteries used in Analytical Example 1 and the internal resistance of the RF batteries was investigated. In Experimental Example 1, the RF battery had a single-cell structure as described in Analytical Example 1 and thus the internal resistance of the RF battery equals the cell resistivity. Thus, the internal resistance of the RF battery is described as a cell resistivity. Test conditions other than the conditions set forth in Analytical Example 1 are as follows.

(Test: Conditions)
Bipolar plate
A bipolar plate prepared by powder compaction using 80% graphite and 20% polypropylene as a matrix resin
Electrode
Carbon electrode (GDL10AA produced by SGL Carbon Japan Co., Ltd.)
Membrane
Nafion 212 produced by Du Pont Kabushiki Kaisha The cell resistivity of the RF battery was obtained from the formula $(V_1-V_0)/0.9$ where $V_0$ is an open circuit voltage when an electrolyte was fed under the same conditions as those of the simulation in Analytical Example 1 and $V_1$ is a cell voltage after 20 seconds of feeding a 0.9 A charging current.

The cell resistivity of the four models was as follows: model 1: 0.86 $\Omega \cdot cm^2$, model 2: 0.86 $\Omega \cdot cm^2$, model 3: 0.90 $\Omega \cdot cm^2$, model 4: 0.98 $\Omega \cdot cm^2$. These results show that the cell resistivity can be decreased when the inter-groove distance is larger than the width of the opening. The model 3 had a high cell resistivity although the inter-groove distance was larger than the width of the opening. This is presumably because the groove has a small cross-sectional area, which makes the electrolyte distribution uneven and localizes the sites of the battery reactions, and the cell resistivity increased as a result.

INDUSTRIAL APPLICABILITY

A bipolar plate according to the present invention is suitable for use as a bipolar plate of a flow battery, such as a redox flow battery. A redox flow battery according to the present invention is suitable for use as a battery for load leveling or as a battery for instantaneous voltage drop and power failure.

REFERENCE SIGNS LIST 100 redox flow battery (RF battery)
100C battery cell
101 membrane, 102 positive electrode cell, 103 negative electrode cell
104 positive electrode, 105 negative electrode
106 positive electrode electrolyte tank, 107 negative electrode electrolyte tank
108 to 111 duct
112, 113 pump
200 cell stack
120 cell frame, 121 bipolar plate, 122 frame body
123, 124 liquid supply manifold, 125, 126 liquid discharge manifold
127 seal structure
1, 2 bipolar plate
10 flow channel, 10i inflow channel, 10o outflow channel
11 groove, 11x horizontal groove, 11y vertical groove
11a opening, 11b bottom, 11c inter-groove distance
11m wide portion, 11n narrow portion

The invention claimed is:

1. A bipolar plate sandwiched between a positive electrode in which a positive electrode electrolyte flows and a negative electrode in which a negative electrode electrolyte flows, comprising:
a positive-electrode-side surface in which a flow channel having a plurality of grooves through which the positive electrode electrolyte flows is provided and a negative-electrode-side surface in which a flow channel having a plurality of grooves through which the negative electrode electrolyte flows is provided,
wherein each of the flow channels includes an inflow channel through which the electrolyte flows into the electrode and an outflow channel through which the electrolyte flows out of the electrode,
the inflow channel and the outflow channel are not in communication with each other and are independent from each other,
the grooves each have a wide portion inside the groove, the wide portion having a width larger than a width of an opening of the groove, and
wherein the grooves each include a narrow portion that has a constant width from the opening toward a bottom of the groove and the wide portion that is directly connected to the narrow portion and has a constant width down to the bottom.

2. The bipolar plate according to claim 1, wherein an inter-groove distance between side edges of the openings of the adjacent grooves is larger than the width of the opening.

3. The bipolar plate according to claim 1, wherein, when the opening has a width x,
the grooves each have a cross-sectional area equal to or larger than 10 times $x^2$.

4. The bipolar plate according to claim 1, wherein the inflow channel and the outflow channel each have a comb-teeth-shaped region, and the inflow channel and the outflow channel are arranged so that the comb-teeth-shaped regions oppose each other so as to be interdigitated.

5. A redox flow battery comprising the bipolar plate according to claim 1.

* * * * *